United States Patent [19]

Cossetti

[11] Patent Number: 4,678,258
[45] Date of Patent: Jul. 7, 1987

[54] CONNECTORS FOR THE CONNECTION OF LIGHTS ON MOTOR VEHICLES

[75] Inventor: Giuliano Cossetti, Tolmezzo, Italy

[73] Assignee: Seima Italiana S.p.A., Tolmezzo, Italy

[21] Appl. No.: 701,455

[22] Filed: Feb. 14, 1985

Related U.S. Application Data

[63] Continuation of Ser. No. 505,441, Jun. 17, 1983, abandoned.

[30] Foreign Application Priority Data

Aug. 27, 1982 [IT] Italy .................. 83437 A/82

[51] Int. Cl.⁴ .................. B60Q 1/26; H01R 13/60
[52] U.S. Cl. .................. 439/571; 439/668; 439/541; 439/561
[58] Field of Search .................. 339/95 D, 17 F, 126, 339/119 L, 125 L, 182 L; 29/846, 848, 849, 850; 174/68.5

[56] References Cited

U.S. PATENT DOCUMENTS

| | | | |
|---|---|---|---|
| 2,757,319 | 7/1956 | Karp | 174/68.5 X |
| 2,772,501 | 12/1956 | Malcolm | 29/849 X |
| 3,107,061 | 10/1963 | Morgan | 339/21 R X |
| 3,150,907 | 9/1964 | Petroske | 339/21 R X |
| 3,745,509 | 7/1973 | Woodward et al. | 339/17 F X |
| 3,763,456 | 10/1973 | Di Salv et al. | 339/17 D |
| 3,887,258 | 6/1975 | Cunningham et al. | 339/119 L X |
| 3,904,261 | 9/1975 | Cooney | 339/17 F |
| 3,911,716 | 10/1975 | Weglin | 29/846 X |
| 3,913,223 | 10/1975 | Gigoux | 29/848 |
| 3,999,826 | 12/1976 | Youtin | 339/17 F |
| 4,227,760 | 10/1980 | Witek | 339/17 D X |
| 4,348,071 | 9/1982 | Hsieh | 339/17 F X |
| 4,578,741 | 3/1986 | Prohasha et al. | 339/182 L X |

Primary Examiner—Eugene F. Desmond
Attorney, Agent, or Firm—Stevens, Davis, Miller & Mosher

[57] ABSTRACT

A panel for the connection of lights on motor vehicles, comprising strip connectors and a support defining guiding walls which cooperate by interference with the connectors after installation.

5 Claims, 6 Drawing Figures

CONNECTORS FOR THE CONNECTION OF LIGHTS ON MOTOR VEHICLES

This application is a continuation of application Ser. No. 505,441, filed June 17, 1983, now abandoned.

This invention relates to connectors for the connection of lights on motor vehicles and panels containing the connectors.

Strip-type connectors are known which are, for instance, of the type shown in Italian patent application No. 83366 A/80 in the name of the present author. It is known that such connectors are coupled up with fasteners, screws, rivets, retaining plates or the equivalent or other means.

It is also known to use small plastic shafts or bridges which are then deformed at least at their sides, thus creating a vertical obstacle to movement of the plates.

This deformation can be brought about by hot or cold treatment or with ultrasonic treatment, depending on the kind of equipment employed.

It is known that these small shafts have drawbacks as regards grip and strength. These small shafts make uncertain the operations of setting-up, improvement or replacement of the connectors during installation and during trials and, thereafter, during maintenance.

It is further known that these small shafts or pegs involve relatively long production times with resultant high costs.

It is also known that traditional coupling means such as fasteners or other means tend to become slack and to be detached by vibration.

It is an object of this invention to eliminate the shortcomings of the known art by providing a simplified bulb holder which is easy to fit and which can be simply and readily maintained.

A further object of the invention is to provide an ensured fixture of the metallic conductors on a bulb-holder shield by means of simple pressure owing to the coordination of the shapes taken up by the interacting pieces.

Another object of the invention is to provide a fixture by the interaction of two substantially weak materials without any need of elasticity.

Still another object of the invention is to provide connectors to be fitted even on plastic supports which have undergone dimensional deformation during molding or at a later time.

According to the invention constructional elements interact with each other and make possible a stable fixture having a secure effect in the long term. The constructional elements also permit replacement and/or maintenance operations without endangering thereby the conditions of the fixture itself and therefore without allowing displacements or slackening which could otherwise be harmful.

The invention therefore embodies connectors for the connection of lights on motor vehicles, whereby the connectors are of a strip type with a possible connecting zone, and a support comprises at least small positioning and/or guiding walls which cooperate by interference with the connectors after installation.

Other details and features of the invention will stand out from the description given below by way of non-limitive example and with reference to the accompanying drawings, in which:

In FIGS. 1-6, the same parts or parts having the same functions bear the same reference numbers.

Figure 1:
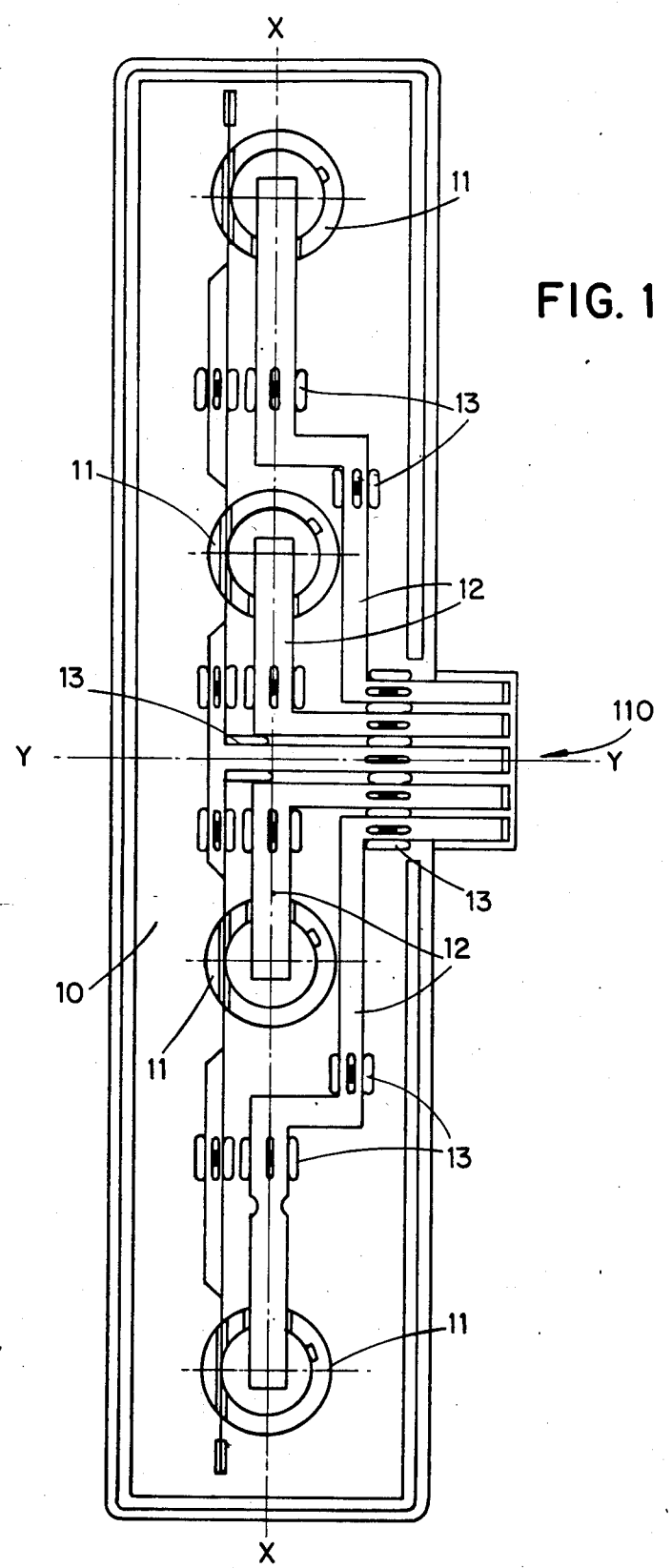
FIG. 1 shows a front view of a multi-purpose bulb holder for a rear light on motor vehicles.

In FIGS. 1-6, there is shown a plastic support 10, which is a support for a multi-purpose bulb holder for a rear light on motor vehicles, has an axis Y and an axis X. The connectors and the bulbs extend along the axis X.

The plastic support 10 comprises bulb holders 11 and connectors 12, which enable current to be fed to the lamps.

In a zone 110 the various connectors 12 are side by side so as to enable the multi-way connecting block to be formed for connection electrically to the electrical equipment of a motor vehicle.

Small guiding walls 13 are provided in several zones on the plastic support 10 which ensures alignment of the metallic parts in relation to the plastic parts. According to the invention the guiding walls 13 are arranged parallel to the axis Y in the zone 110 of connection of the connectors 12.

In the other zones the guiding walls 13 are arranged advantageously parallel to the axis X which enables the connectors 12 to be positioned correctly independently of any dimensional deformation undergone by the support 10 during molding or any later phase.

Indeed, the presence of the small positioning and/or guiding walls 13 arranged lengthwise along the axis X enables the metallic parts to slide in relation to the plastic parts.

According to the invention means for reciprocal connection are such as to be able to be actuated by mere pressure.

A second embodiment of the invention is shown in FIG. 2a wherein besides the two small side walls 13 a small middle wall 14 cooperates with a slot 15.

The middle wall 14 can have a thickness substantially the same as the width of the central slot 15 or can have an expansion 114 on the end thereof so that the connector 12 is inserted between the side walls 13 and the middle wall 14 passing into the slot 15 under pressure.

According to a third embodiment the middle wall 14 can have a thickness 214 slightly greater than or about equal to the width of the central slot 15.

According to the invention the length of the middle wall 14 in relation to the length of the central slot 15 will be such as to allow natural sliding for the alignment and positioning of the connector 12 in relation to the bulb holders 11 and to the zone 110 of connection of the connectors independently of the rest of the support 10.

Figure 3:
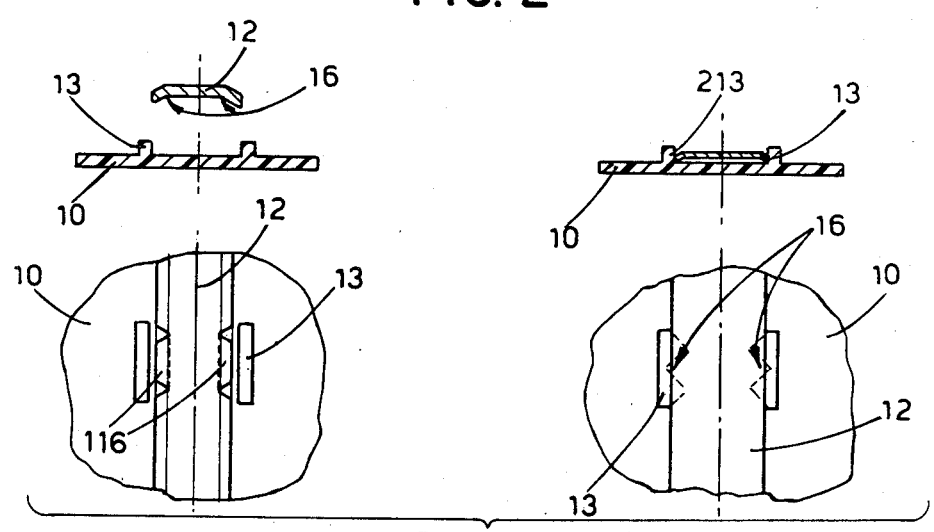

FIG. 3 shows a fourth embodiment whereby lateral means 116 are comprised in the connectors 12 and cooperate with the side walls 13. These means 116 are made slightly tilted in relation to the connectors 12 and are pressed, when being fitted, inside the side walls 13, thus creating with their teeth 16 an interference 213 directly against the walls 13 themselves.

Figure 4:
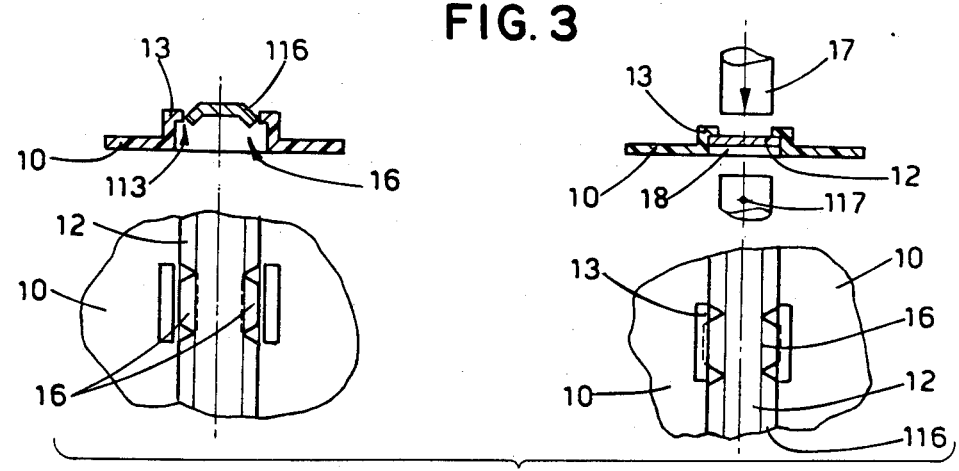

According to a fifth embodiment of FIG. 4 the side walls 13 can include an undercut 113, so that the teeth 16 or teeth means 116 cooperate with the undercut 113.

The undercut 113 can have a height greater, smaller than or the same as the height or thickness of the connector 12, thus creating a suitable degree of interference and interconnection.

Figure 5:
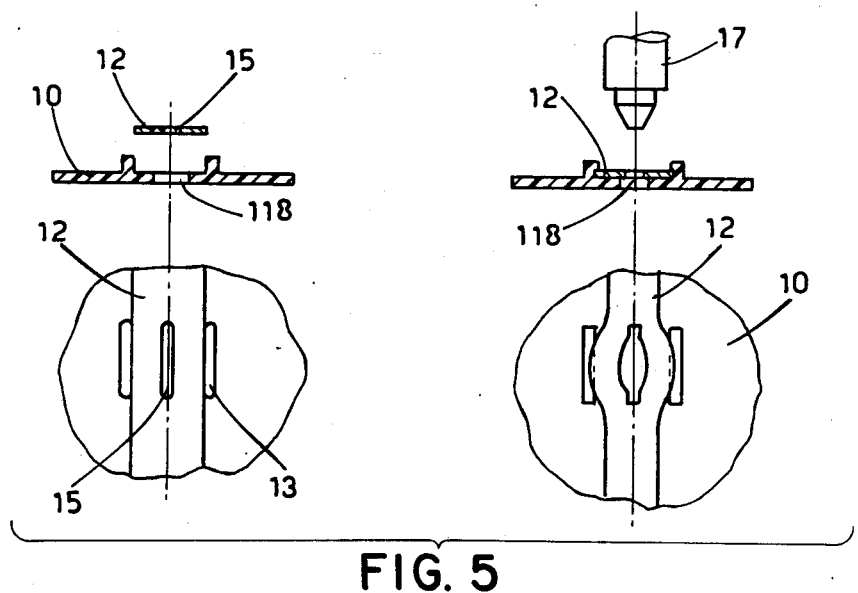

FIG. 5 shows a sixth embodiment. In FIG. 5 the connector 12 has a central slot 15 which cooperates during installation with a punch 17 that substantially enlarges the slot 15, thus deforming the connector 12 at its sides and creating a resultant interconnection between the side walls 13 and the connector 12.

Figure 6:
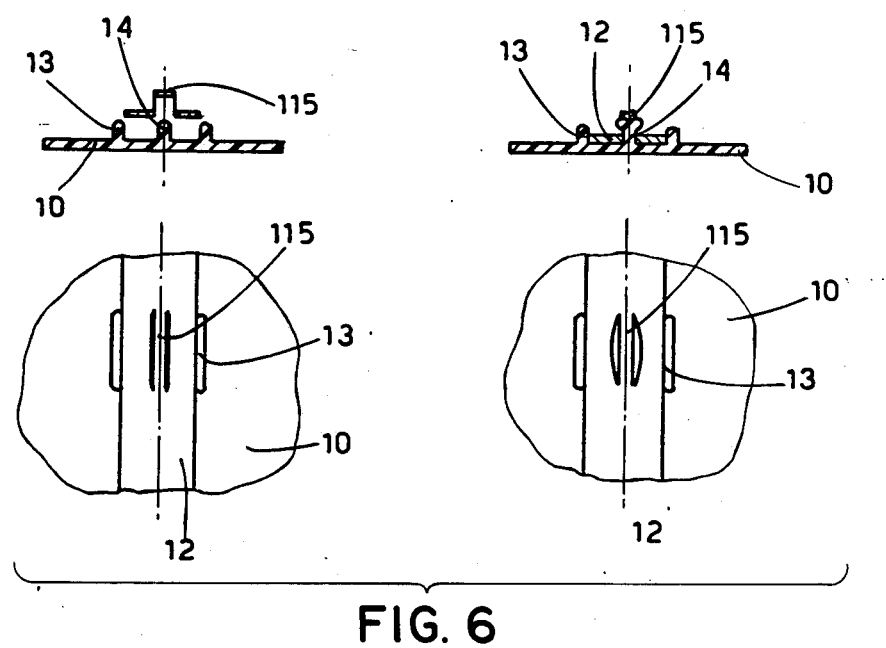

A seventh embodiment is shown in FIG. 6 wherein the slot 15 of connector 12 is not wholly free but is only split at the sides, thus forming an upper bridge 115. The upper bridge 115 cooperates with the middle wall 14, so that it creates in the wall 14 during installation a deformation which is retained by the mutual positions of the bridge 115 and the connector 12.

According to the invention some holes 18 or 118 facilitate the work of the punches 17 in a position beneath the connection zone. These holes 18 or 118 can have various sizes and their configuration is substantially unimportant as long as they fulfill the specific tasks for which they were designed.

Thus, for instance, in FIG. 4 the hole 18 may enable a counterpunch 117 to be included to cooperate with the upper punch 17.

Figure 2:
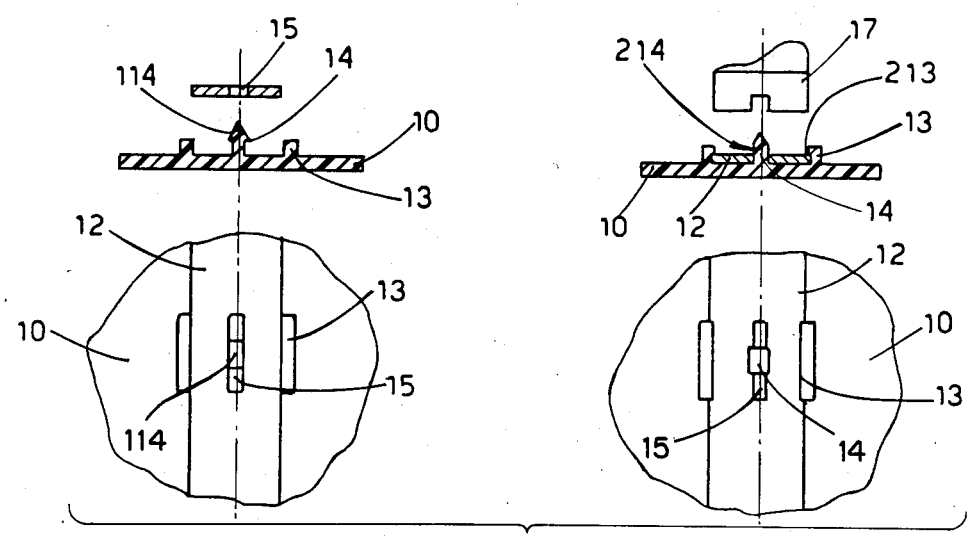
FIGS. 2, 3, 4, 5 and 6 show the improvements of the invention.

According to the invention, besides possible interference against the middle wall 14 an interference 213 can also be created against the side walls 13, thus balancing the connection since the clamping action is distributed over four opposed faces (FIG. 2).

Any plastic slackening in one direction will lead to greater interference in the opposite direction, thus ensuring a secure attachment.

INDEX

X: lengthwise axis
Y: axis at right angles to X
10: support
110: connection zone
11: bulb holders
12: connectors
13: small positioning and/or guiding walls
113: undercuts
213: interference
14: middle wall
114: swelling
214: interference
15: slot
115: bridge
16: side teeth
116: side teeth before installation
17: punch
117: counterpunch
18: holes to facilitate work of punch
118: holes to facilitate work of punch

I claim:

1. A panel for lights on motor vehicles, which comprises applied conductor-element strips and an insulating support, said support defining at least two walls for each conductor-element strip permitting a conductor-element strip to slide reciprocally, such walls cooperating with the conductor-element strip by interference, said two walls being opposite each other, between which fits the conductor-element strip, said support defining a central wall between said two walls, said conductor-element strip having a slot therein which fits over said central wall and which is longer than the central wall, said central wall having an undercut, the placement of the conductor-element strip over the central wall taking place by elastic deformation of the central wall.

2. A panel for lights on motor vehicles, which comprises applied conductor-element strips and an insulating support, said support defining at least two walls for each conductor-element strip permitting a conductor-element strip to slide reciprocally, such walls cooperating with the conductor-element strip by interference, said two walls being opposite each other, between which fits the conductor-element strip, said support defining a central wall between said two walls, said conductor-element strip having a slot therein which fits over said central wall and which is longer than the central wall, said conductor-element strip defining a bridge over the central wall.

3. A panel for lights on motor vehicles, which comprises applied angled conductor-element strips and an insulating support, said support defining at least two walls for each conductor-element strip permitting a conductor-element strip to slide reciprocally, such walls cooperating with the conductor-element strip by interference, said support defining at least two additional walls oriented substantially perpendicularly in relation to said walls, such additional walls clamping the conductor-element strip in a zone on the support, said conductor-element strip having lateral teeth which spread out, after being fitted, to cooperate with the walls.

4. A panel for lights on motor vehicles, which comprises applied angled conductor-element strips and an insulating support, said support defining at least two walls for each conductor-element strip permitting a conductor-element strip to slide reciprocally, such walls cooperating with the conductor-element strip by interference, said support defining at least two additional walls oriented substantially perpendicularly in relation to said walls, such additional walls clamping the conductor-element strip in a zone on the support, said support defining at least one hole between said opposing walls and the conductor-element strip being deformable and defining a longitudinal slot parallel to said walls and registrable with said hole to permit the insertion of a punch to deform a portion of the conductor-element strip transversely and force the deformed portion against the walls.

5. A panel for lights on motor vehicles, which comprises applied angled conductor-element strips and an insulating support, said support defining at least two walls for each conductor-element strip permitting a conductor-element strip to slide reciprocally, such walls cooperating with the conductor-element strip by interference, said support defining at least two additional walls oriented substantially perpendicularly in relation to said walls, such additional walls clamping the conductor-element strip in a zone on the support, each said conductor-element strip being deformed sideways and outwards between the walls.

* * * * *